US012753831B2

(12) United States Patent
Liu et al.

(10) Patent No.: US 12,753,831 B2
(45) Date of Patent: Oct. 6, 2026

(54) LINEAR MOTOR

(71) Applicant: Beijing Youzhuju Network Technology Co., Ltd., Pinggu District (CN)

(72) Inventors: Yunfei Liu, Beijing (CN); Guangzeng Chen, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/039,475

(22) Filed: Jan. 28, 2025

(65) Prior Publication Data

US 2025/0383012 A1 Dec. 18, 2025

(30) Foreign Application Priority Data

Jun. 14, 2024 (CN) ......................... 202410773135.5

(51) Int. Cl.

| | |
|---|---|
| ***H02K 7/06*** | (2006.01) |
| ***F16H 25/24*** | (2006.01) |
| ***H02K 7/08*** | (2006.01) |
| ***H02K 7/102*** | (2006.01) |
| ***H02K 11/215*** | (2016.01) |
| *F16H 25/20* | (2006.01) |

(52) U.S. Cl.

CPC ........... *F16H 25/2454* (2013.01); *H02K 7/06* (2013.01); *H02K 7/08* (2013.01); *H02K 7/1025* (2013.01); *H02K 11/215* (2016.01); *F16H 2025/2031* (2013.01); *F16H 2025/2078* (2013.01)

(58) Field of Classification Search

CPC ............................................... F16H 2025/2078

See application file for complete search history.

(56) References Cited

U.S. PATENT DOCUMENTS

| | | | | |
|---|---|---|---|---|
| 3,161,074 A * | 12/1964 | Korthaus ................. | B61G 9/18 74/89.34 |
| 2010/0059944 A1* | 3/2010 | Oteman ................... | H02K 7/06 74/25 |

FOREIGN PATENT DOCUMENTS

| | | |
|---|---|---|
| CN | 103414281 A | 11/2013 |
| CN | 114802150 A | 7/2022 |
| DE | 906876 C * | 3/1954 |

OTHER PUBLICATIONS

Machine translation of DE-906876-C (Year: 1954).*

* cited by examiner

*Primary Examiner* — Randell J Krug

(74) *Attorney, Agent, or Firm* — Alleman Hall LLP

(57) ABSTRACT

A linear motor is provided. The linear motor includes an output shaft, a stator sleeved outside the output shaft, a rotor sleeved outside the output shaft and in screw-thread fit with the output shaft, and a brake unit sleeved outside the output shaft. The rotor is coupled with the stator and is driven to rotate by an electromagnetic force generated between the rotor and the stator, thereby driving the output shaft to move axially. Through screw-thread fit between the rotor and the output shaft, the linear motor is conducive to reducing the radial dimension, the output shaft may move smoothly with low noise and large output power, higher control precision may be obtained. When the brake unit is sleeved outside the output shaft, a circumferential space on the periphery of the output shaft may be fully utilized to arrange the brake unit, braking on the output shaft is stable.

17 Claims, 1 Drawing Sheet

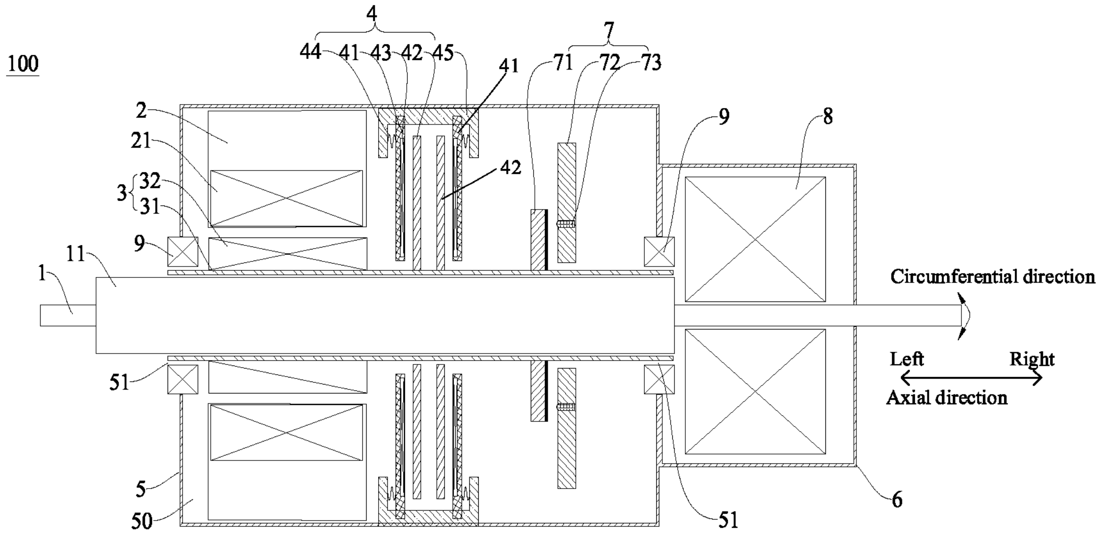
100
4
44
41
43
42
45
41
42
7
71
72
73
2
21
3
32
31
9
11
1
9
8
Circumferential direction
Left
Right
Axial direction
51
5
50
51
6

LINEAR MOTOR

CROSS-REFERENCE TO RELATED APPLICATION

The present application claims the priority of the Chinese Patent Application No. 202410773135.5 filed on Jun. 14, 2024, which is incorporated herein by reference as part of the disclosure of the present application.

TECHNICAL FIELD

The present disclosure relates to a field of motor, in particular to a linear motor.

BACKGROUND

The linear motor is widely used in the fields such as mechanical devices and robots to convert rotary motion of a motor into linear motion, and acts as an actuator driving mechanism to achieve product functionality. However, more additional parts are required when functions of a linear motor are more complex, and accordingly, an external dimension of the linear motor is greater. If the space of an application scenario is limited, then many parts may not be installed, thereby limiting functions. Therefore, how to optimize an internal structure of the linear motor still needs further research.

SUMMARY

The present disclosure aims at solving at least one of the technical problems in the prior art. To this end, the present invention provides a linear motor, which can further improve compactness of the layout of internal parts and reduce the external dimension of the linear motor.

According to the linear motor of the embodiment of the present disclosure, the linear motor includes an output shaft; a stator, sleeved on the output shaft; a rotor, sleeved on and in screw-thread fit with the output shaft, in which the rotor is coupled with the stator, and the rotor is driven to rotate by an electromagnetic force generated between the rotor and the stator and drives the output shaft to move axially; and a brake unit, sleeved on the output shaft.

According to the embodiment of the present disclosure, the linear motor converts the rotation of the rotor into the axial movement of the output shaft through screw-thread fit between a rotor and an output shaft, on the one hand, the compact layout of the rotor and the output shaft is beneficial for reducing a radial dimension of the linear motor, on the other hand, the output shaft may move stably with low noise and large output power, and a higher control precision may be obtained. When a brake unit is sleeved on the output shaft, a circumferential space on the periphery of the output shaft may be fully utilized to arrange the brake unit, the braking on the output shaft is stable, the output shaft is subjected to less torque, and the compactness is improved through compact stacking.

In some embodiments, the brake unit comprises: a first brake member connected to the stator; and a second brake member connected to the rotor and arranged in close proximity to the first brake member; in which an electromagnetic part is arranged on at least one of the first brake member and the second brake member, and the first brake member and the second brake member are configured such that when the electromagnetic part is energized, the first brake member is separated from the second brake member, and when the electromagnetic part is de-energized, the first brake member and the second brake member come into contact and generate a frictional force for braking.

Specifically, both the first brake member and the second brake member are annular pieces sleeved on the output shaft.

Further, at least two first brake members are spaced apart along the output shaft, and the second brake member is arranged between two adjacent first brake members;

- at least one of the first brake members is provided with an electromagnetic part, and the two adjacent first brake members are repelled to be spaced apart from the second brake member during energization; and
- the brake unit further comprises an elastic member configured to drive the two adjacent first brake members to be close to each other, so as to drive the first brake members to move and contact with the second brake member when the electromagnetic part is de-energized.

In some embodiments, the linear motor further comprises a main housing, in which an accommodating cavity is defined in the main housing, and an output opening is formed on at least one end of two opposite ends of the main housing;

- the output shaft, the stator, the rotor, and the brake unit are all arranged inside the accommodating cavity, at least one end of the output shaft fits outside the main housing via the output opening, and the rotor is arranged around the output shaft, and the stator surrounds the rotor and is fixedly connected to the main housing Specifically, the rotor comprises: a nut; and a first excitation assembly, fixedly connected to periphery of the nut; in which the output shaft is a lead screw fitting with the nut, and the brake unit is sleeved on an outer side of the nut.

Further, two opposite ends of the main housing are both provided with the output openings, and two ends of the output shaft are located at the two output openings, respectively; and

- the linear motor further comprises two supporting bearings, and the two supporting bearings respectively fit at the two output openings and are sleeved on the nut.

In some embodiments, the linear motor further comprises an angle detection unit configured to detect a rotation position of the rotor.

Specifically, the angle detection unit comprises: a rotating piece, sleeved on the output shaft and fixedly connected to the rotor; a supporting piece, sleeved on the output shaft and fixed relative to the stator, in which the supporting piece is arranged in close proximity to the rotating piece; and an angle sensor, arranged on the supporting piece to sense and detect a position of the rotating piece.

In some embodiments, the stator is provided with a second excitation assembly coupled with the rotor, the linear motor further comprises a driver electrically connected with the second excitation assembly and the brake unit, and the driver is annular and is sleeved on an outer side of the output shaft.

Additional aspects and advantages of the present disclosure will be given in part in the following description, and in part will become apparent from the following description, or will be learnt through practice of the present disclosure.

BRIEF DESCRIPTION OF DRAWINGS

The above and/or additional aspects and advantages of the present disclosure will become apparent and readily understood from the description of the embodiments in combination with the following accompanying drawings, in which:

The FIGURE is a structural schematic diagram of a linear motor of an embodiment of the present disclosure.

REFERENCE NUMERALS IN THE FIGURE linear motor 100;
output shaft 1, lead screw 11;
stator 2, second excitation assembly 21;
rotor 3, nut 31, first excitation assembly 32;
brake unit 4, first brake member 41, second brake member 42, electromagnetic part 43, elastic member 44, sliding table 45, main housing 5, accommodating cavity 50, output opening 51;
secondary housing 6,
angle detection unit 7, rotating piece 71, supporting piece 72, angle sensor 73, driver 8;
supporting bearing 9.

DETAILED DESCRIPTION

Embodiments of the present disclosure are described in detail below, and examples of the embodiments are shown in the accompanying drawings, in which the same or similar reference numerals throughout denote the same or similar elements or elements having the same or similar functions. The embodiments described below by reference to the accompanying drawings are exemplary and are merely used for explaining the present disclosure and are not to be construed as a limitation of the present disclosure.

In the description of the present disclosure, it should be understood that the orientation or positional relationship indicated by such terms as “center”, “length”, “thickness”, “left”, “right”, “top”, “bottom”, “inner”, “outer”, “axial”, “radial”, “circumferential” is the orientation or positional relationship based on the accompanying drawing. Such terms are merely for the convenience of description of the present disclosure and simplified description, rather than indicating or implying that the device or element referred to must be located in a certain orientation or must be constructed or operated in a certain orientation, therefore, the terms cannot be understood as a limitation to the present disclosure. Further, the features defined as “first” and “second” may expressly or implicitly include one or more such features. In the description of the present disclosure, unless otherwise stated, “a plurality of” means two or more.

In the description of the present disclosure, it should be noted that, unless otherwise expressly specified and defined, the terms “installation”, “connected” and “connection” should be understood in their broad sense, e.g., the connection may be a fixed connection, a detachable connection or an integral connection, may be mechanical connection or electrical connection, may be direct connection or indirect connection through an intermediate, and may be communication between two elements. For those skilled in the art, specific meanings of the above terms in the present disclosure may be understood according to specific conditions.

A linear motor 100 according to an embodiment of the present disclosure is described below with reference to the FIGURE.

Referring to the FIGURE, the linear motor 100 according to an embodiment of the present disclosure includes: an output shaft 1, a stator 2, a rotor 3 and a brake unit 4, in which the stator 2, the rotor 3 and the brake unit 4 are all sleeved on the output shaft 1.

The rotor 3 is sleeved on and in screw-thread fit with the output shaft 1, the rotor 3 is coupled with the stator 2, and the rotor 3 is driven to rotate by an electromagnetic force generated between the rotor 3 and the stator 2 and drives the output shaft 1 to move axially. Specifically, a first excitation assembly 32 is arranged on the rotor 3, a second excitation assembly 21 is arranged on the stator 2, and the first excitation assembly 32 is coupled with the second excitation assembly 21.

Generally, the stator 2 is a fixed portion of the linear motor 100, the stator 2 includes a stator core, and the second excitation assembly 21 includes a stator winding wound on the stator core. The stator winding is connected to an AC power supply, and the stator winding will generate a rotating magnetic field during energization. The rotor 3 is a rotating portion in the linear motor 100, the rotor 3 includes a rotor core, the first excitation assembly 32 may include a permanent magnet embedded within the rotor core or on the periphery of the rotor core, or the first excitation assembly 32 may include a rotor winding wound on the rotor core. In the rotating magnetic field generated by the second excitation assembly 21 of the stator 2, the first excitation assembly 32 of the rotor 3 is stimulated to rotate, thereby generating an induced electromotive force, thus the conversion of energy from electrical energy to kinetic energy is achieved.

In the solution of the present application, since the rotor 3 is sleeved on and in screw-thread fit with the output shaft 1, the rotor 3 only rotates relative to the stator 2 and may not move axially, and driven by a bevel pressure of threads, the output shaft 1 may be driven to move axially. Since the stator 2 is connected to the AC power supply, the generated rotating magnetic field changes its direction when the phase of the AC power supply changes, such that the rotation direction of the rotor 3 may be switched bi-directionally between forward and backward directions, and further the output shaft 1 may move bi-directionally along an axial direction, that is, the output shaft 1 in the FIGURE may move leftwards and rightwards, so as to flexibly adjust displacement of the output shaft 1.

Due to screw-thread fit between the rotor 3 and the output shaft 1, compared with other drive modes, the drive mode of converting from rotation into linear movement is featured by smooth movement, low noise and large output power. Moreover, pitch parameters of the threads may be flexibly selected to achieve suitable control precision. For example, when the thread is a one-way thread and the pitch is 1 mm, the linear movement distance of the output shaft 1 is 1 mm when the rotor 3 rotates by 360 degrees, and at this time, the linear movement distance of the output shaft 1 is $\frac{1}{360}$ mm when the rotor 3 rotates by 1 degree each time, therefore, the linear movement control precision of the output shaft 1 may be relatively high.

In the present application, the brake unit 4 is sleeved on the output shaft 1, and the brake unit 4 is arranged inside rather than outside the linear motor 100, therefore, a peripheral space of the output shaft 1 may be fully utilized to arrange the brake unit 4.

In particular, since the output shaft 1 has a length requirement in an axial direction, for example, the length is usually determined when a conventional lead screw nut structure is adopted, the lead screw nut with a long stroke has enough length space to accommodate the stator 2, the rotor 3 and the brake unit 4. Therefore, the peripheral circumferential space of the output shaft 1 is large, the external dimension of the linear motor 100 will not be increased too much after the brake unit 4 is arranged, and the overall length of the linear motor 100 may be shortened as much as possible. In particular, some brake units 4 are of a chip-type structure, and the linear motor 100 may be equal in dimension no matter whether the brake unit 4 is arranged or not, therefore, the brake unit 4 is arranged to facilitate compact stacking of various components inside the linear motor 100 and realize a complete module function at a high level of integration. When the dimensions are the same, the linear motor 100 of the present application is smaller in size due to compactness, thereby being convenient for adapting to different application scenarios and facilitating installation and arrangement.

In addition, since the brake unit 4 is sleeved on the output shaft 1, when the brake unit 4 is started to brake the output shaft 1, a braking force of the brake unit 4 may be directly applied to the rotor 3, and may also be directly applied to the output shaft 1, or may be applied to the rotor 3 and the output shaft 1 simultaneously. Whether the braking force is applied to the rotor 3 or to the output shaft 1, the output shaft 1 is finally subjected to a circumferential holding force. The holding of the output shaft 1 from the circumference requires a smaller holding force, the braking on the output shaft 1 is more stable and the output shaft 1 is subjected to less torque.

According to the linear motor 100 of the embodiment of the present disclosure, through screw-thread fit between the rotor 3 and the output shaft 1, rotation of the rotor 3 is converted into axial movement of the output shaft 1. On the one hand, the compact layout of the rotor 3 and the output shaft 1 is conducive to reducing the radial dimension of the linear motor 100, and on the other hand, the output shaft 1 can move smoothly with low noise and large output power, and a higher control precision may be obtained. When the brake unit 4 is sleeved on the output shaft 1, a circumferential space on the periphery of the output shaft 1 may be fully utilized to arrange the brake unit 4, braking on the output shaft 1 is stable, the output shaft 1 is subjected to less torque, and the compactness is improved through compact stacking.

In some embodiments, as shown in the FIGURE, the brake unit 4 includes: a first brake member 41 and a second brake member 42. The first brake member 41 is connected to the stator 2, and the first brake member 41 herein may be directly connected to the stator 2 or may be indirectly connected to the stator 2. The second brake member 42 is connected to the rotor 3, the second brake member 42 rotates along with the rotor 3, and the second brake member 42 herein may be directly connected to the rotor 3 or may be indirectly connected to the rotor 3. The second brake member 42 is arranged in close proximity to the first brake member 41.

Through such an arrangement, the first brake member 41 does not rotate relative to the stator 2, while the second brake member 42 rotates along with the rotor 3. When the brake unit 4 is not started, the first brake member 41 and the second brake member 42 are separated and do not interfere with each other, and rotation of the output shaft 1 is driven by the rotation of the rotor 3. At this time, if the rotor 3 does not output a driving force, the output shaft 1 may be driven by an external force to rotate.

After the brake unit 4 is started, the first brake member 41 and the second brake member 42 are held together, and the second brake member 42 cannot rotate under a frictional force generated between the first brake member 41 and the second brake member 42, such that the rotor 3 is held tightly and cannot rotate. Since the rotor 3 is in screw-thread fit with the output shaft 1, it is equivalent to holding the output shaft 1 tightly such that the output shaft 1 cannot rotate. At this time, if the rotor 3 outputs a driving force, the output shaft 1 cannot move under the braking by the brake unit 4. At this time, if the rotor 3 does not output a driving force, but an external force is applied to the output shaft 1, the output shaft 1 cannot move under the driving of the brake unit 4.

In some specific embodiments, as shown in the FIGURE, an electromagnetic part 43 is arranged on at least one of the first brake member 41 and the second brake member 42, and the first brake member 41 and the second brake member 42 are configured such that when the electromagnetic part 43 is energized, the first brake member 41 is separated from the second brake member 42, and when the electromagnetic part 43 is de-energized, the first brake member 41 and the second brake member 42 come into contact and generate a frictional force for braking. In other words, the brake unit 4 is opened by de-energizing the electromagnetic part 43, while the electromagnetic part 43 is de-energized through active de-energization of the brake unit 4 as required, such that the output shaft 1 is held tightly and braked. The de-energization of the electromagnetic part 43 may also be passive de-energization, such that the output shaft 1 is held tightly and braked, that is, the de-energization and self-locking functions are realized.

Particularly, when the linear motor 100 is widely used in mechanical devices, robots and other products, the linear motor 100 acts as an actuator to realize functions of a product, if the product is suddenly de-energized, this means that the linear motor 100 is also powered off. At this time, the electromagnetic part 43 of the linear motor 100 is passively de-energized to start the brake unit 4, and the linear motor 100 maintains its state before de-energization, such that the product maintains a pose before de-energization. As a result, the product is prevented from being deformed in actions due to external loads, thereby being conducive to improving safety and reliability of the product. For example, the linear motor 100 acts as an arm of a robot, and a gripper is connected to an end of the arm for holding a cup. When the arm lifts the cup and when the robot is suddenly de-energized, the arm maintains a state of lifting the cup before de-energization, thereby preventing the cup from falling off due to retraction of the arm caused by the weight of the cup.

Specifically, as shown in the FIGURE, the first brake member 41 and the second brake member 42 are both annular pieces that are sleeved on the output shaft 1. Through such an arrangement, the first brake member 41 and the second brake member 42 are equivalent to brake pads, during starting, the first brake member 41 and the second brake member 42 stick close to each other with a large contact area, and a large contact area can generate significant frictional force, which ensures reliable braking performance. Moreover, the first brake member 41 and the second brake member 42 are annular and may hold the rotor 3 by 360 degrees along a circumferential direction, the holding force is distributed along a circumferential direction, and the bearing force per unit circumference is small and the damage is small.

The first brake member 41 and the second brake member 42 are arranged to be annular pieces that are sleeved on the output shaft 1, thereby reasonably occupying the circumferential space on the periphery of the output shaft 1, which is conducive to the stacking and arrangement of parts along an axial direction.

In some specific embodiments, as shown in the FIGURE, at least two first brake members 41 are spaced apart along the output shaft 1, and the second brake member 42 is arranged between two adjacent first brake members 41. Through such an arrangement, the contact area between the first brake member 41 and the second brake member 42 may be increased to further improve reliability of the braking performance.

In which at least one first brake member 41 is provided with an electromagnetic part 43, and two adjacent first brake members 41 are repelled to be spaced apart from the second brake member 42 during energization. The brake unit 4 further includes an elastic member 44 configured to drive two adjacent first brake members 41 to be close to each other, so as to drive the first brake members 41 to move and contact with the second brake member 42 when the electromagnetic part 43 is de-energized. In this way, when the brake unit 4 is not started, an elastic force of the elastic member 44 is overcome by a repulsive force generated by the electromagnetic part 43, such that the first brake member 41 and the second brake member 42 are separated from each other. After the brake unit 4 is started, the repulsive force of the electromagnetic part 43 disappears, and the elastic force of the elastic member 44 drives the first brake member 41 and the second brake member 42 to stick to each other tightly to generate a frictional force. Through such an arrangement, the brake unit 4 is started simply with a low error rate.

Herein, the first brake member 41 may be fixed relative to the stator 2, that is, the first brake member 41 may not rotate or move axially relative to the stator 2. The first brake member 41 may also move axially relative to the stator 2, such that the first brake member 41 moves axially to switch states under the driving of the above repulsive force or elastic force.

Herein, the second brake member 42 may be fixed relative to the rotor 3, that is, the second brake member 42 may not rotate or move axially relative to the rotor 3. The second brake member 42 may also move axially relative to the rotor 3, such that the second brake member 42 moves axially to switch states when driven by the above repulsive force or elastic force.

In some optional embodiments, a main housing 5 of the linear motor 100 is internally provided with a stator 2 and a rotor 3, and the stator 2 is fixedly connected to the main housing 5. The main housing 5 is further internally provided with a sliding table 45, and the sliding table 45 is fixedly connected to the main housing 5. The first brake member 41 is movably mounted on the sliding table 45 along an axial direction, however, the first brake member 41 may not rotate relative to the sliding table 45, and the sliding table 45 may support a circumferential outer edge of the first brake member 41. Through such an arrangement, the brake unit 4 is simple to assemble and less likely to interfere with other parts.

Of course, in the solution of the present application, the layout positions of the first brake member 41 and the second brake member 42 are not limited to the solution shown in the FIGURE, and the first brake member 41 and the second brake member 42 may also be arranged alternately along tan axial direction.

Alternatively, the brake unit 4 adopts other structures, for example, the brake unit 4 includes a retractable brake column, the brake column may be arranged along an axial direction of the output shaft 1, and props against the output shaft 1 or abuts against the rotor 3 when the brake column extends out. Alternatively, the brake column is arranged on an axial side of the rotor 3 and props against an end face of the rotor 3 when the brake column extends out. For another example, the brake unit 4 is of a hoop structure, and the hoop is annular and is sleeved on the rotor 3 or the output shaft 1. The hoop is provided with an opening, such that when the opening becomes larger, an inner circumference of the hoop increases to loosen the rotor 3 or the output shaft 1, and when the opening becomes smaller, the inner circumference of the hoop decreases to hold the rotor 3 or the output shaft 1.

In some embodiments, the linear motor 100 further includes: a main housing 5, an accommodating cavity 50 defined in the main housing 5, and an output opening 51 formed on at least one end of the two opposite ends of the main housing 5. The output shaft 1, the stator 2, the rotor 3, and the brake unit 4 are all arranged in the accommodating cavity 50, at least one end of the output shaft 1 fits outside the main housing 5 via the output opening 51, and the rotor 3 is arranged around the output shaft 1, the stator 2 surrounds the rotor 3 and is fixedly connected to the main housing 5. Through such an arrangement, the internal structure of the linear motor 100 may be protected by the main housing 5, thereby reducing the possibility of damage caused by clamped impurities.

Of course, in some products, the linear motor 100 may not include the main housing 5, and then the output shaft 1, the stator 2, the rotor 3, and the brake unit 4, which have relatively fixed positions, are directly mounted inside a product, and a product mounting housing is taken as a protective housing of the linear motor 100.

Specifically, the rotor 3 includes: a nut 31 and a first excitation assembly 32, in which the first excitation assembly 32 is fixedly connected to the periphery of the nut 31. The output shaft 1 is a lead screw 11 fitting with the nut 31, and the brake unit 4 is sleeved on the outer side of the nut 31. In this way, the output shaft 1 and the nut 31 may adopt a lead screw-nut structure commonly used in traditional mechanical devices, and the lead screw-nut structure has a mature production process, such that the assembly clearance between the rotor 3 and the output shaft 1 is small with a high control precision, and a large axial force is transmitted, and the reliability is high when low-speed and intermittent work is performed.

The type of the lead screw 11 is not limited herein, and the lead screw 11 may adopt an ordinary lead screw, a T-shaped lead screw, a ball lead screw, a roller lead screw, etc.

Of course, no nut 31 may be arranged in the solution of the present application, and an internal thread may be processed on the rotor core of the rotor 3 to fit with the external thread of the output shaft 1.

In some further embodiments, as shown in the FIGURE, output openings 51 are formed at two opposite ends of the main housing 5, and two ends of the output shaft 1 are located at the two output openings 51, respectively. In this way, the output shaft 1 may extend from two axial ends of the main housing 5 to meet more functional needs of the linear motor 100.

Specifically, the linear motor 100 further includes two supporting bearings 9, the two supporting bearings 9 fit at the two output openings 51 respectively and are sleeved on the nut 31. The output openings 51 at the two ends of the main housing 5 are taken as mounting positions for the supporting bearings 9 to support the rotor 3 and the output shaft 1.

Specifically, as shown in the FIGURE, the rotor 3 includes a nut 31, two ends of the nut 31 are assembled in two supporting bearings 9, and the two supporting bearings 9 directly support the nut 31. The output shaft 1 is arranged in the nut 31, and the output shaft 1 is indirectly supported by the two supporting bearings 9. Through such an arrangement, the nut 31 may rotate relative to the main housing 5 under the support by the two supporting bearings 9, but may not move axially. The output shaft 1 may move axially under the drive of the nut 31, and during practical applications, only one end of the output shaft 1 may extend out of the main housing 5, or two ends of the output shaft 1 may extend out of the main housing 5.

In some embodiments, as shown in the FIGURE, the stator 2 is provided with a second excitation assembly 21 coupled with the rotor 3. The linear motor 100 further includes a driver 8, and the driver 8 is electrically connected with the second excitation assembly 21 and the brake unit 4. In other words, the driver 8 is a control core of the linear motor 100, to control starting, operation, and braking of the linear motor 100.

Specifically, the driver 8 is annular and is sleeved on the outer side of the output shaft 1. In this way, the peripheral space of the output shaft 1 is further utilized to reduce the overall external dimensions of the linear motor 100, and facilitate installation and layout.

Specifically, as shown in the FIGURE, the linear motor 100 further includes a secondary housing 6, the secondary housing 6 is connected to an axial side of the main housing 5, and the driver 8 is mounted in the secondary housing 6. In this way, the driver 8 obtains a separate retention housing through the secondary housing 6, with little mutual interference during assembly and convenient maintenance.

In some embodiments, as shown in the FIGURE, the linear motor 100 further includes: an angle detection unit 7 configured to detect the rotation position of the rotor 3. Thereby realizing precise position and/or speed control, and improving controllability of the action of the linear motor 100.

Specifically, the angle detection unit 7 is sleeved on the output shaft 1, and the circumferential space on the periphery of the output shaft 1 may be fully used. Moreover, the angle detection unit 7 is located inside the linear motor 100, and during detection, external interference is little with a high measurement precision.

Specifically, as shown in the FIGURE, the angle detection unit 7 includes: a rotating piece 71, a supporting piece 72 and an angle sensor 73. The rotating piece 71 is sleeved on the output shaft 1 and is fixedly connected to the rotor 3, the supporting piece 72 is sleeved on the output shaft 1 and is fixed relative to the stator 2, and the supporting piece 72 is arranged in close proximity to the rotating piece 71. The angle sensor 73 is arranged on the supporting piece 72 to sense and detect the position of the rotating piece 71. In this way, the main body of the angle detection unit 7 is in a form of a sheet, thereby being conducive to achieving compact stacking of the parts inside the linear motor 100.

Specifically, a plurality of induction parts are spaced apart uniformly on the rotating piece 71 along a circumferential direction, and an induction end of the angle sensor 73 is arranged towards the rotating piece 71, and the induction part arrives at a position directly opposite to the induction end of the angle sensor 73 during each rotation by a certain angle. In this way, the rotation angle of the rotor 3 may be determined according to the number of induction parts sensed by the angle sensor 73. Under a premise of controllable cost, more induction parts may be arranged on the rotating piece 71, thereby improving the detection precision.

Specifically, the angle sensor 73 may be a Hall sensor, such that the detection technology is mature and highly reliable.

Of course, the solution of the present application is not limited hereto, and the linear motor 100 may also be provided with a force measuring sensor with a force control function.

In the solution of the present application, the rotor 3 is sleeved on and in screw-thread fit with the output shaft 1, and the output shaft 1 requires a larger axial dimension, at this time, a certain circumferential space exists on the periphery of the output shaft 1. Through the arrangement of the solution of the present application, the above circumferential space may be fully utilized, thereby facilitating reduction of the overall dimension of the linear motor 100 and facilitating flexible arrangement in various application scenarios.

In which, the stator 2, the brake unit 4 and the angle detection unit 7 may be stacked in the main housing 5 along the axial direction, and axial positions of the stator 2, the brake unit 4 and the angle detection unit 7 are not limited and may be switched arbitrarily. The driver 8 is stacked in the secondary housing 6 along an axial direction.

The principles of the structure of the driver 8 and the like of the linear motor 100 according to an embodiment of the present disclosure are known to those skilled in the art, and will not be described in detail herein.

In the description of the present specification, the descriptions with reference to the terms of "embodiment", "example" and the like intend to mean that specific features, structures, materials, or characteristics described in combination with the embodiment or example are included in at least one embodiment or example of the present disclosure. In the present specification, schematic expressions of the above terms do not necessarily refer to the same embodiment or example. Moreover, the specific features, structures, materials or characteristics described may be combined in any one or more embodiments or examples in a suitable manner.

Although the embodiments of the present disclosure have been shown and described, those skilled in the art may understand that a wide variety of changes, modifications, substitutions, and variations may be made to these embodiments without departing from the principles and objects of the present disclosure, and the scope of the present disclosure is limited by the claims and their equivalents.

The invention claimed is:

1. A linear motor, comprising:

an output shaft;

a stator sleeved outside the output shaft;

a rotor sleeved outside the output shaft and in screw-thread fit with the output shaft, wherein the rotor is coupled with the stator, wherein the rotor is driven to rotate by an electromagnetic force generated between the rotor and the stator and drives the output shaft to move axially in an axial direction; and a brake unit sleeved outside the output shaft and configured to apply braking to the output shaft, wherein the rotor comprises:

a nut; and a first excitation assembly fixedly connected to an outer periphery of the nut, wherein the output shaft comprises a lead screw fitting with the nut, and the brake unit is sleeved on an outer side of the nut, and wherein the nut extends in the axial direction, the brake unit and the first excitation assembly are arranged at intervals in the axial direction, and the first excitation assembly, the stator and the brake unit all overlap with the nut in a direction perpendicular to the axial direction.

2. The linear motor according to claim 1, wherein the stator is provided with a second excitation assembly coupled with the rotor, the linear motor further comprises a driver electrically connected with the second excitation assembly and the brake unit, and the driver is annular and is sleeved on an outer side of the output shaft.

3. The linear motor according to claim 1, further comprising an angle detection unit configured to detect a rotation position of the rotor.

4. The linear motor according to claim 3, wherein the angle detection unit comprises:

a rotating piece sleeved outside the output shaft and fixedly connected to the rotor;

a supporting piece sleeved outside the output shaft and fixed relative to the stator, wherein the supporting piece is arranged adjacent to the rotating piece; and an angle sensor arranged on the supporting piece to sense and detect a position of the rotating piece.

5. The linear motor according to claim 1, further comprising: a main housing, wherein an accommodating cavity is defined in the main housing, and an output opening is formed on at least one end of two opposite ends of the main housing;

the output shaft, the stator, the rotor, and the brake unit are all arranged inside the accommodating cavity, at least one end of the output shaft fits outside the main housing via the output opening, the rotor is arranged around the output shaft, and the stator surrounds the rotor and is fixedly connected to the main housing.

6. The linear motor according to claim 5, wherein two opposite ends of the main housing are both provided with the output openings, and two ends of the output shaft are located at the two output openings, respectively; and the linear motor further comprises two supporting bearings, and the two supporting bearings respectively fit at the two output openings and are sleeved outside the nut.

7. The linear motor according to claim 5, further comprising an angle detection unit configured to detect a rotation position of the rotor.

8. The linear motor according to claim 5, wherein the stator is provided with a second excitation assembly coupled with the rotor, the linear motor further comprises a driver electrically connected with the second excitation assembly and the brake unit, and the driver is annular and is sleeved on an outer side of the output shaft.

9. The linear motor according to claim 1, wherein the brake unit comprises:

a first brake member, connected to the stator; and a second brake member, connected to the rotor and arranged adjacent to the first brake member; wherein an electromagnetic part is arranged on at least one of the first brake member and the second brake member, and the first brake member and the second brake member are configured such that when the electromagnetic part is energized, the first brake member is separated from the second brake member, and when the electromagnetic part is de-energized, the first brake member and the second brake member come into contact and generate a frictional force for braking.

10. The linear motor according to claim 9, further comprising an angle detection unit configured to detect a rotation position of the rotor.

11. The linear motor according to claim 9, wherein the stator is provided with a second excitation assembly coupled with the rotor, the linear motor further comprises a driver electrically connected with the second excitation assembly and the brake unit, and the driver is annular and is sleeved on an outer side of the output shaft.

12. The linear motor according to claim 9, wherein at least two first brake members are spaced apart along the output shaft, and at least two second brake members are arranged between two adjacent first brake members;

at least one of the first brake members is provided with the electromagnetic part, and the two adjacent first brake members are repelled to be spaced apart from the second brake members during energization; and the brake unit further comprises an elastic member configured to drive the two adjacent first brake members to move toward each other, so as to drive each of the first brake members to make contact with a corresponding one of the second brake members when the electromagnetic part is de-energized.

13. The linear motor according to claim 12, further comprising an angle detection unit configured to detect a rotation position of the rotor.

14. The linear motor according to claim 12, wherein the stator is provided with a second excitation assembly coupled with the rotor, the linear motor further comprises a driver electrically connected with the second excitation assembly and the brake unit, and the driver is annular and is sleeved on an outer side of the output shaft.

15. The linear motor according to claim 9, wherein both the first brake member and the second brake member are annular pieces sleeved outside the output shaft.

16. The linear motor according to claim 15, further comprising an angle detection unit configured to detect a rotation position of the rotor.

17. The linear motor according to claim 15, wherein the stator is provided with a second excitation assembly coupled with the rotor, the linear motor further comprises a driver electrically connected with the second excitation assembly and the brake unit, and the driver is annular and is sleeved on an outer side of the output shaft.

* * * * *